United States Patent
De Vos et al.

(10) Patent No.: US 10,958,210 B2
(45) Date of Patent: Mar. 23, 2021

(54) INTEGRATED CIRCUIT FOR ENERGY HARVESTING WITH SYNCHRONIZATION MEANS

(71) Applicant: E-PEAS, S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 0 days.

(21) Appl. No.: 16/755,943

(22) PCT Filed: Oct. 17, 2018

(86) PCT No.: PCT/EP2018/078429
§ 371 (c)(1),
(2) Date: Apr. 14, 2020

(87) PCT Pub. No.: WO2019/076988
PCT Pub. Date: Apr. 25, 2019

(65) Prior Publication Data
US 2020/0321910 A1 Oct. 8, 2020

(30) Foreign Application Priority Data
Oct. 18, 2017 (EP) .................................... 17197003

(51) Int. Cl.
*H02S 40/30* (2014.01)
*G05F 1/67* (2006.01)
*H02J 3/46* (2006.01)

(52) U.S. Cl.
CPC ................ *H02S 40/30* (2014.12); *G05F 1/67* (2013.01); *H02J 3/46* (2013.01); *H02J 2300/26* (2020.01)

(58) Field of Classification Search
CPC .. G05F 1/66; G05F 1/67; H02J 50/001; H02J 3/385; H02J 3/46; H02J 50/46; H02J 7/35;
(Continued)

(56) References Cited

U.S. PATENT DOCUMENTS

| 2013/0155735 | A1* | 6/2013 | Ilic | .......................... H02M 7/48 363/71 |
| 2015/0229131 | A1* | 8/2015 | Gerhardinger | ............ H02J 7/35 307/22 |

(Continued)

FOREIGN PATENT DOCUMENTS

WO 2016/073944 A1 5/2016

OTHER PUBLICATIONS

Int'l. Search Report for PCT/EP2018/078429, dated Jan. 2, 2019.
(Continued)

*Primary Examiner* — Yemane Mehari
(74) *Attorney, Agent, or Firm* — Blue Filament Law PLLC (57) ABSTRACT

An integrated circuit (IC) for energy harvesting is provided. The IC includes a voltage converter for converting an input power into an output power and a power point tracker for determining a target voltage for regulating the input voltage of the voltage converter. The IC includes an interface circuit to exchange information between the controller of the IC and one or more additional IC's for energy harvesting. The controller of the IC is configured to enable switching to a normal operating state on condition that a trigger signal from the interface circuit changes from a first reference value to a second reference value. The controller is further configured for outputting a status signal to the interface circuit wherein the status signal indicates if the power point tracker is enabled or disabled.

13 Claims, 6 Drawing Sheets

(58) Field of Classification Search
CPC ......... H02S 40/30; H02M 7/44; H02M 7/515; H02M 7/527; H02M 7/537; H02M 7/539
USPC .................... 323/282, 299, 906; 363/95, 97
See application file for complete search history.

(56) References Cited

U.S. PATENT DOCUMENTS

| | | | |
|---|---|---|---|
| 2017/0126010 A1* | 5/2017 | Canales | H02J 1/102 |
| 2017/0338394 A1* | 11/2017 | Rozgic | G01K 7/02 |
| 2020/0233443 A1* | 7/2020 | De Vos | H02J 3/381 |

OTHER PUBLICATIONS

J. H. R Enslin, et al.: "Integrated photovoltaic maximum power point tracking converter", IEEE Transactions on Industrial Electronics, Jan. 1, 1997 (Jan. 1, 1997), pp. 769-773, XP055463255, DOI: 10.1109/41.649937 Retrieved from the Internet: URL:http://ieeexplore.ieee.org/ielx3/41/14174/00649937.pdf.

E-Peas Semiconductors: "AEM10940 data sheet", Nov. 17, 2016 (Nov. 17, 2016), pp. 1-16, XP055463289, Retrieved from the Internet: URL:https://e-peas.com/wp-content/uploads/2016/02/DS_AEM10940_REV1.4.pdf [retrieved-on Mar. 27, 2018] cited in the application the whole document.

* cited by examiner

INTEGRATED CIRCUIT FOR ENERGY HARVESTING WITH SYNCHRONIZATION MEANS

FIELD OF THE INVENTION

The present invention relates to an integrated circuit for energy harvesting. These IC's are used for extracting power from an energy harvester such as for example a photovoltaic cell or photovoltaic panel, a thermal electric generator or an electromagnetic energy source. The invention also relates to a power management system for energy harvesting. According to a further aspect of the invention a method is provided for managing energy from a single energy harvester.

DESCRIPTION OF PRIOR ART

A power management integrated circuit (PMIC) for energy harvesting is known in the art for extracting power from an energy harvester. Such a PMIC typically comprises a power input terminal for receiving an input power, a voltage converter, a power point tracker, a power output terminal for supplying an output power and a controller for controlling the voltage converter and the power point tracker.

The power point tracker determines a target voltage $V_T$ for regulating an input voltage $V_{in}$ of the voltage converter at this target voltage $V_T$ so as to optimally extracting power from the energy harvester.

The control unit is generally configured for switching an operation state of the PMIC between a normal operation state and a power point tracking state. The normal operation state is a state wherein the power point tracker is disabled and wherein the voltage converter is enabled for converting the input power into the output power. While the power point tracking state is a state wherein the voltage converter is disabled and wherein the power point tracker is enabled for determining the target voltage $V_T$.

Generally, the switching from the normal operation state to this power point operation state is performed repetitively, for example every 15 seconds and the duration of the power point tracking state is for example in the millisecond or hundreds of milliseconds range. For example, in WO2016/073944A1, it is disclosed that the interruption of the power extraction to determine a target voltage $V_T$ is managed by a clock generator providing start and stop inputs at a 600 microsecond period and at a 7/8 duty cycle.

The output of the voltage converter is connected with an output terminal for supplying an output power. The output terminal can then be connected with for example an energy storage device and/or an application load. The application load is for example an application circuit such as microcontroller or a radio transceiver.

An IC for energy harvesting is available from the applicant of the current patent application and known under the reference number AEM10940. The IC is a microchip that is designed to acquire and manage the microwatts to milliwatts of power generated by the energy harvester. These PMIC's are rated for a maximum power that can be transferred and are designed for efficient operation in a given power range.

As a consequence, when the energy harvester is able to supply more power than the PMIC is able to transfer, then this exceeding power is lost. Generally, the voltage at the output of the energy harvester will increase and the PMIC will not operate at the maximum power point anymore.

SUMMARY OF THE INVENTION

It is an object of the present invention to provide an IC for energy harvesting that provides a solution for the limited power range mentioned above with respect to the current IC's for energy harvesting and the problems occurring when the energy harvester is supplying a higher output power than can be handled by the IC.

The present invention is defined in the appended independent claims. Preferred embodiments are defined in the dependent claims.

According to a first aspect of the invention, an integrated circuit for energy harvesting is provided. Such an IC comprises a power input terminal for receiving an input power from an energy harvester, a voltage converter for converting the input power into an output power, a power point tracker for determining a target voltage $V_T$ for regulating an input voltage of the voltage converter, a power output terminal for supplying the output power to an energy storage device or an application load and a controller for controlling the voltage converter and the power point tracker.

The controller is configured for switching the integrated circuit to various operation states, and wherein the various operation states comprise at least a normal operation state and a power point tracking state. A normal operating state is a state wherein the power point tracker is disabled and wherein the voltage converter is enabled for converting the input power into the output power. A power point tracking state is a state wherein the voltage converter is disabled and wherein the power point tracker is enabled for determining the target voltage $V_T$.

The IC according to the invention is characterized in that it comprises an interface circuit for exchanging signal information between the controller and one or more external devices. Preferably, the one or more external devices are additional integrated circuits (IC's) for energy harvesting.

The controller is coupled with the interface circuit and configured for receiving a trigger signal $EN_{VC}$ and configured for switching the IC to the normal operating state on condition that the trigger signal $EN_{VC}$ received from the interface circuit has changed from a first reference value to a second reference value. Preferably, the trigger signal $EN_{VC}$ is a digital signal.

The controller is further configured for transmitting a status signal $PPT_{stat}$ to the interface circuit. A first PPT value and a second PPT value of the status signal $PPT_{stat}$ indicate if the power point tracker is respectively enabled or disabled.

Advantageously, the IC for energy harvesting according to the invention does not switch automatically from the power point tracking state to the normal operating state when the power point tracking is completed. Instead, the IC according to the invention only switches from the power point tracking state to the normal operating state on condition that a trigger signal $EN_{VC}$ received from an interface circuit has changed from a first reference value to a second reference value. In this way, an external condition can be defined to allow the IC for energy harvesting to start operating in the normal operating state after having performed a power point tracking.

Advantageously, by coupling the controller with an interface circuit, information can be exchanged between the controller and for example one or more additional integrated circuits for energy harvesting. In this way, the interface circuit allows to couple and synchronize multiple IC's for energy harvesting from a common energy harvester and ensure that when an IC switches to a normal operating state, another IC is not in the power point tracking state, as this would influence the power point tracking procedure. For example, when coupling a first and a second IC for energy harvesting to a common energy harvester, an external condition to switch the first IC to the normal operating state is that the second IC is not in a power point tracking state. And vice versa, an external condition to switch the second IC to a normal operating state is that the first IC is not in the power point tracking state.

Advantageously, when coupling multiple IC's according to the invention to a common energy harvester, the connection means coupling the interface circuits allow that each IC for energy harvesting is performing the optimum power point evaluation under the same conditions, i.e. under conditions where no power is transferred to the output terminals of any of the IC's.

Advantageously, depending on the power capacity of the energy harvester, the number of integrated circuits coupled to the energy harvester can be increased or decreased. In this way, if the power capacity of the energy harvester is larger than the power transfer capacity of a single IC, by adding a second or more IC's the energy harvesting efficiency is maximised.

In preferred embodiments, the interface circuit comprises monitoring means configured for monitoring at least one input signal $S_{IN}$ and for generating the trigger signal $EN_{VC}$ based on the at least one input signal $S_{IN}$. Hence, the input signal $S_{IN}$ can also be named voltage converter enabling signal as this signal defines a condition for switching to a normal operating state wherein the voltage converter is enabled. The interface circuit further comprises outputting means for generating at least one output signal $S_{OUT}$ based on the power point tracker status signal $PPT_{stat}$.

According to a second aspect of the invention, a method for managing energy from a single energy harvester is provided as defined in the appended claims.

SHORT DESCRIPTION OF THE DRAWINGS

These and further aspects of the invention will be explained in greater detail by way of example and with reference to the accompanying drawings in which.

The figures are not drawn to scale. Generally, identical components are denoted by the same reference numerals in the figures.

DETAILED DESCRIPTION OF PREFERRED EMBODIMENTS

The integrated circuit (IC) for energy harvesting, also named power management integrated circuit (PMIC) for energy harvesting, according to the invention has to be construed as a microchip comprising a number of circuit elements and input/output pins, also named terminals. For example, an IC for energy harvesting can have between 16 and 32 terminals. Generally, the IC's for energy harvesting have a compact packaging resulting in a square or rectangular footprint with sides having a length between 3 and 5 mm. On the FIGS. 1 to 3, the rectangular with a dotted pattern schematically illustrates the footprint of the PMIC.

A part of an integrated circuit (IC) for energy harvesting according to the invention is schematically illustrated on FIG. 1a to FIG. 3. However, not all circuit elements and components of an IC for energy harvesting are shown on the figures, only these circuit elements and components are shown that are necessary for implementing the invention.

The IC for energy harvesting 1 comprises a power input terminal 11 for receiving an input power $P_{in}$ from an energy harvester and a power output terminal 12 for supplying an output power $P_{out}$ to an energy storage device or an application load. A voltage converter 20 is converting the input power into the output power and the voltage converter 20 is further configured for regulating the input voltage $V_{in}$ at a target voltage $V_T$ for optimally extracting power from the energy harvester. A power point tracker 30 is determining this target voltage $V_T$.

Figure 1A:
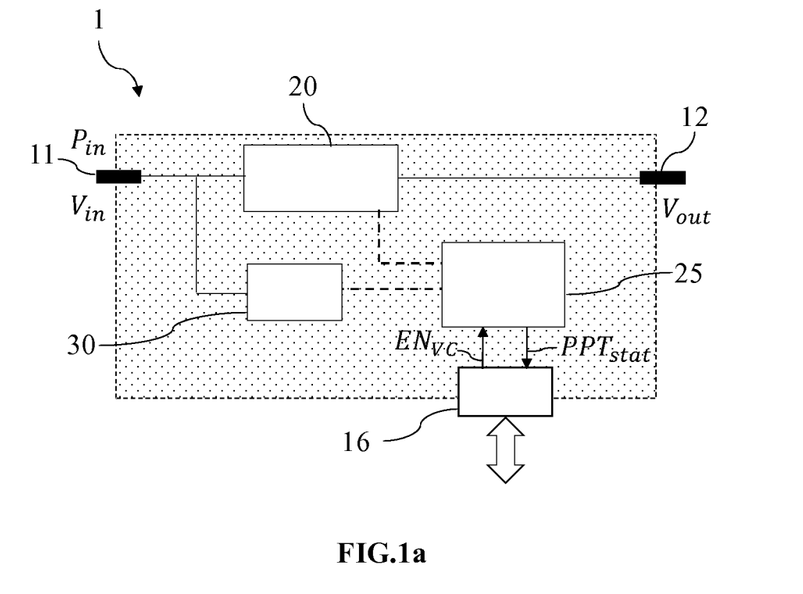
FIG. 1a schematically illustrates a part of an IC for energy harvesting according to the invention, FIG. 1b schematically illustrates a part of a further example of an IC for energy harvesting according to the invention, FIG. 2 schematically illustrates a part of an exemplary embodiment of an IC for energy harvesting according to the invention, FIG. 3 schematically illustrates a part of an alternative embodiment of an IC for energy harvesting according to the invention.

As schematically illustrated on FIG. 1a, the IC for energy harvesting comprises a controller 25 for controlling the voltage converter 20 and for controlling the power point tracker 30. The controller 25 is configured for switching the IC for energy harvesting to various operation states, and wherein the various operation states comprise at least a normal operation state and a power point tracking state.

As mentioned above, a normal operation state is a state wherein the power point tracker 30 is disabled and wherein the voltage converter 20 is enabled for converting the input power into the output power, and a power point tracking state is a state wherein the voltage converter 20 is disabled and wherein the power point tracker 30 is enabled for determining the target voltage $V_T$. Such a controller for controlling the voltage converter and the power point tracker is known in the art and is for example implemented in the above referenced IC with reference number AEM10940.

As schematically illustrated on FIG. 1a, the IC for energy harvesting according to the invention is characterized in that it comprises an interface circuit 16. This interface circuit 16 allows for exchanging signal information between the controller 25 and one or more additional IC's for energy harvesting.

The interface circuit 16 has to be construed as an interface that allows exchanging signal information in two directions. It allows both transmitting signal information from the controller 25 to the one or more additional IC's for energy harvesting and transmitting signal information from the one or more additional IC's for energy harvesting to the controller 25.

The controller according to the invention is configured for enabling the IC to switch to the normal operating state on condition that a trigger signal $EN_{VC}$ received from the interface circuit 16 has changed from a first reference value to a second reference value. Preferably, the trigger signal $EN_{VC}$ is a digital signal.

The controller 25 is further configured for transmitting a status signal $PPT_{stat}$ to the interface circuit 16, wherein a first PPT value and a second PPT value of the status signal $PPT_{stat}$ indicate if the power point tracker 30 is respectively enabled or disabled.

Figure 1B:
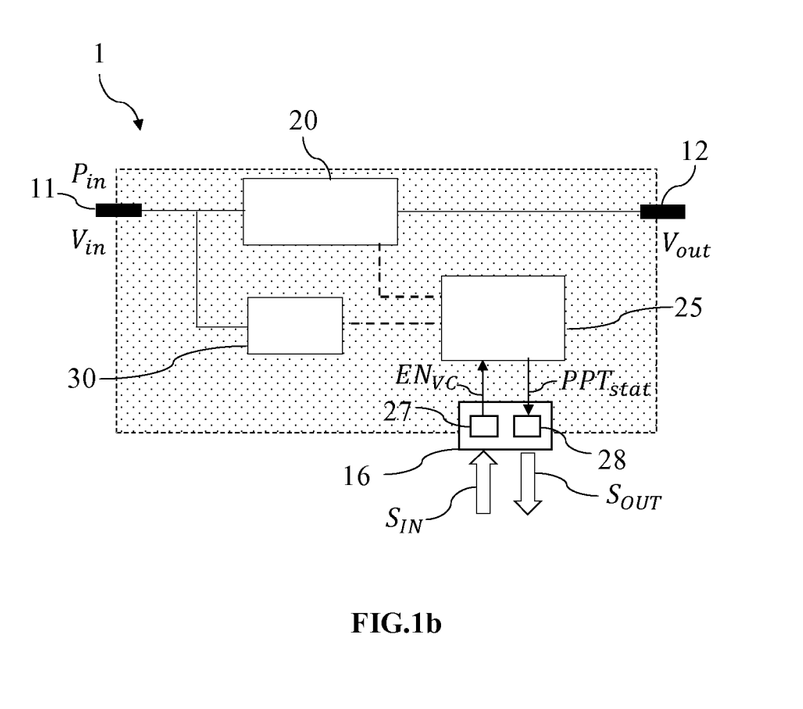

In preferred embodiments according to the invention, the interface circuit 16, as schematically illustrated on FIG. 1b, comprises a monitoring means 27 for monitoring at least one input signal $S_{IN}$ for enabling operation of the voltage converter. Based on this at least one input signal $S_{IN}$ for enabling operation of the voltage converter, the monitoring means generates the trigger signal $EN_{VC}$.

In these preferred embodiments, the interface circuit 16 further comprises outputting means 28 for generating at least one output signal $S_{OUT}$ based on the power point tracker status signal $PPT_{stat}$. The at least one output signal $S_{OUT}$ comprises information indicating when the power point tracker 30 is enabled or disabled.

The voltage converter 20 corresponds for example to a DC-DC boost converter circuit for increasing the input voltage $V_{in}$, or a buck converter circuit for decreasing the input voltage, or a buck-boost converter circuit for both decreasing or increasing the input voltage. These type of voltage converters are known in the art.

The power point tracker (PPT) is known in the art to determine the target operational input voltage $V_T$ of the voltage converter in order to extract efficiently the power out of the energy harvester. For example, the IC for energy harvesting available from the applicant of the current patent application and known under the reference number AEM10940 comprises such a power point tracker. Generally, the target voltage $V_T$ is a voltage that is determined to be optimum for extracting maximum power from the energy harvester. The target operational input voltage $V_T$ determined by the PPT is then used by the voltage converter as a target value to regulate the input voltage of the voltage converter during power extraction from the energy harvester.

Generally, the target voltage $V_T$ is determined by the power point tracker by sensing a voltage at the input of the power point tracker and taking a fraction, e.g. 90%, 80%, 50% or 100%, of this voltage as an optimum operational voltage value.

The power point tracking is typically based on an open circuit voltage evaluation of the energy harvester. Therefore, the voltage converter is configured such that the voltage at the input of the power point tracker corresponds to the open circuit voltage of the energy harvester. For example, when a PV cell is used as an energy harvester, the power point tracker obtains the target operational voltage for the PV cell by taking an 80% fraction of the open circuit voltage of the PV cell as sensed at the input of the power point tracker.

As discussed above the power point tracking is performed when the IC is in a power point tracking state wherein the power point tracker is enabled, and the voltage converter is disabled. The controller 25 is configured to disable the power point tracker 30 when the determination of the target voltage $V_T$ is completed. In embodiments, as will be further discussed below, the power point tracker is disabled after a tracking period has lapsed.

In prior art IC's for energy harvesting, when the power point tracking procedure is completed, the IC will switch to the normal operating state by disabling the power point tracker and immediately enabling the voltage converter to extract power from the energy harvester.

As discussed above, in the IC for energy harvesting according to the invention, the switching to the normal operating state depends on the trigger signal $EN_{VC}$ received from the interface circuit 16. In other words, for the IC for energy harvesting according to the invention, the switching to the normal operating state is not performed automatically by the IC when the power point tracking is completed, but instead the switching depends on an additional external condition provided by the interface circuit.

The invention is not limited to the type of interface circuit or protocol used to exchange the information between the controller and the one or more additional IC's for energy harvesting. Nor is the invention limited to the type of signals received and outputted by the interface circuit.

The input signal $S_{IN}$ for enabling operation of the voltage converter and received by the interface circuit 16 can be an analog signal or a digital signal. How the interface circuit generates the trigger signal $EN_{VC}$ and generates the at least one output signal $S_{OUT}$ can vary from embodiment to embodiment. A number of exemplary embodiments of the interface circuit will be further discussed below.

In embodiments where the input signal $S_{IN}$ for enabling the voltage converter is an analog signal, the monitoring means 27 comprises for example a comparator for comparing the at least one input signal $S_{IN}$ with a threshold value. If the comparator observes that the input signal $S_{IN}$ is below or above the threshold value, the trigger signal $EN_{VC}$ is set to a first reference value or a second reference value, respectively. In embodiments where the interface circuit receives multiple analog input signals $S_{IN}$ for enabling operation of the voltage converters, each of these signals $S_{IN}$ is compared with the threshold value. In this embodiment, the monitoring means 27 sets the trigger signal $EN_{VC}$ to the first reference value if at least one of the multiple input signals for enabling the voltage converters is below the threshold value and sets the trigger signal $EN_{VC}$ to the second reference value if each of the multiple input signals for enabling the voltage converters is above the threshold value.

In embodiments where the input $S_{IN}$ is a single digital signal, the monitoring means 27 monitors this digital signal $S_{IN}$ and transfers the signal to the controller 25. In these embodiments, the trigger signal $EN_{VC}$ can be equal to the input signal $S_{IN}$ for enabling operation the voltage converter. In alternative embodiments, where the monitoring means 27 monitors multiple digital input signals for enabling the voltage converter, the monitor means sets the trigger signal $EN_{VC}$ to the first reference value if at least one of the input signals for enabling the voltage converters is equal to a digital zero and sets the trigger signal $EN_{VC}$ to the second reference value if each of the multiple input signals for enabling the voltage converters is equal to a digital one.

A person skilled in the art can define alternative embodiments for the monitoring means of the interface circuit. What the monitoring means have in common is that the trigger signal $EN_{VC}$ is generated based on the at least one input signal $S_{IN}$ for enabling operation of the voltage converter. Hence, the enabling of the switching from the power point tracking state to the normal operating state depends on at least one external signal.

In embodiments, the first reference value and the second reference value of the trigger signal $EN_{VC}$ corresponds to a digital one value, i.e. a high value, and a digital zero value, i.e. a low value, respectively. In these embodiments, the first PPT value and the second PPT value of the status signal $PPT_{stat}$ indicating if the power point tracker 30 is enabled or disabled correspond to a digital one value, i.e. a high value, and a digital zero value, i.e. a low value, respectively.

In embodiments, as illustrated on FIG. 1b, the interface circuit 16 comprises an outputting means 28 for generating at least one output signal $S_{OUT}$ based on the power point tracker status signal $PPT_{stat}$. The at least one output signal $S_{OUT}$ comprises information indicating when the power point tracker 30 is enabled or disabled.

Various embodiments can be considered by the person skilled in the art for outputting this output signal $S_{OUT}$. In embodiments, the interface circuit 16 comprises at least one communication terminal for receiving the at least one input signal $S_{IN}$ and for outputting the at least one output signal $S_{OUT}$. The use of the word "terminal" such as in a communication terminal, has to be construed as discussed above as a pin of the integrated circuit which, as also discussed above, is to be construed as microchip. A number of embodiments of interface circuits will be discussed below.

Figure 2:
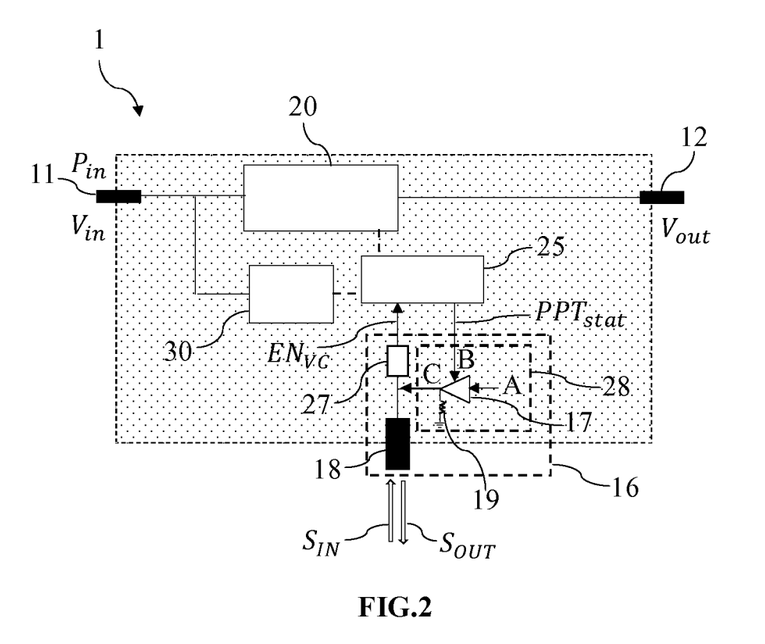

In exemplary embodiments, as schematically illustrated on FIG. 2, the outputting means 28 comprises a tri-state output device 17 having a first input A operably set to a digital one value and a second enabling input B linked with the controller 25 for receiving the status signal $PPT_{stat}$. In the exemplary embodiment illustrated on FIG. 2, a communication terminal 18 is coupled with the output C of the tri-state output device 17. A tri-state output device is well known in the art. The tri-state output device can be interpreted as a switch between the input A and the output B. The enabling input B drives the opening and closing of the switch. In these embodiments the input A is set permanently to a high value or digital one. The enabling input port B is driven by the status signal $PPT_{stat}$ and hence the output C of the tri-state output port will output a high level when the status signal $PPT_{stat}$ is high. As illustrated on FIG. 2, the output C is connected to a ground level through a resistor having a high impedance. Hence, when the enable input B of the tri-state output device is low, the output C results in a low value obtained through the resistance. This zero output value can be interpreted as weak zero value. In this way, when for example a common communication terminal 18 is used for both receiving the input signal $S_{IN}$ and outputting the output signal $S_{OUT}$, as illustrated on FIG. 2, the monitoring means will still monitoring a high value if $S_{IN}$ is high even when $S_{OUT}$ is low. The advantage of using the tri-state output device is that a single wire can be used to establish a bi-directional communication between multiple IC's for energy harvesting, i.e. for receiving the at least one input signal $S_{IN}$ for enabling the voltage converter and for outputting the output signal $S_{OUT}$.

Figure 3:
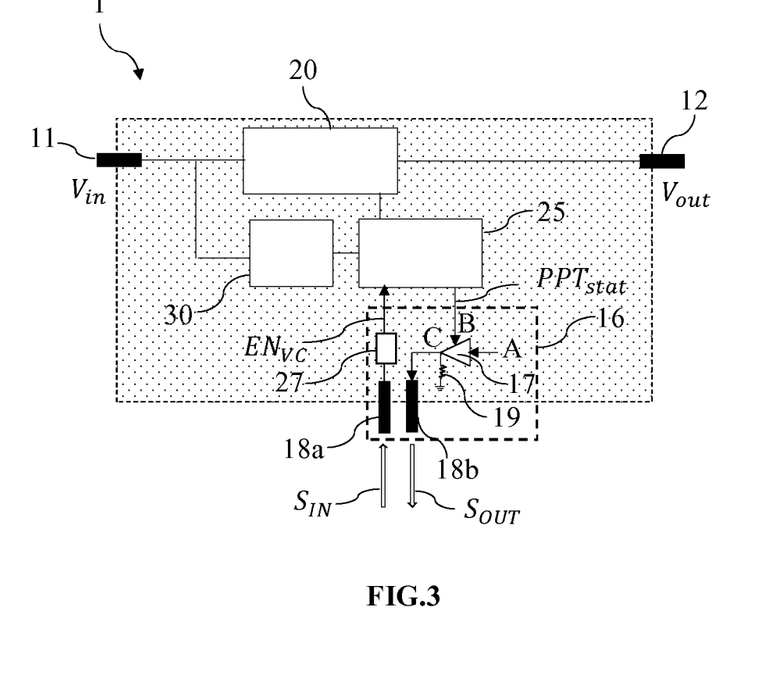

In alternative embodiments, as illustrated on FIG. 3, the interface circuit comprises a first communication terminal 18a for receiving the at least one input signal for enabling the voltage converter $S_{IN}$ and at least a second communication terminal 18b for outputting the output signal $S_{OUT}$.

In embodiments according to the invention, the controller 25 is configured to disable the power point tracker 30 when the target voltage $V_T$ is determined. Typically, a given number of clock signals are counted corresponding to the time needed to perform the power point tracking and determine the optimum voltage $V_T$.

For determining the moment to switch the IC 1 from the normal operating state to the power point tracking state, different implementation solutions are possible depending on the specific IC embodiment. Two solutions will be described which correspond to a so-called master IC and a slave IC.

In embodiments where the IC for energy harvesting is operating as a master IC, the controller 25 comprises a power point triggering device for triggering a switching from the normal operation state to the power point tracking state. The triggering device has to be construed as a device that decides when to stop the energy harvesting and instead start a power point tracking procedure. Depending on the detailed embodiment, the decision to trigger power point tracking can be based on various parameters.

For example, in some embodiments, the power point triggering device comprises a timer configured to switch from the normal operation state to the power point tracking state when a harvesting time period $T_H$ has lapsed while being in the normal operation state. The harvesting time period $T_H$ is a configuration time period and is for example a period between 0.1 and 100 seconds. In other words, in this example, the trigger to switch to the power point tracking state is performed cyclically following a timing signal. This implementation for triggering the switch to the power point tracking state corresponds to what is typically implemented in the prior art IC's for energy harvesting where a single IC is coupled to a single energy harvester.

In the embodiments of a master IC, the controller 25 generates the status signal $PPT_{stat}$ by setting a status value to a first PPT value when the above discussed harvesting time period $T_H$ has lapsed and by setting the status signal to a second PPT value after a tracking time period $T_T$ has lapsed. The tracking time period $T_T$ is for example a period between 1 ms and 1 s. The tracking time period $T_T$ is a configuration value of the IC and corresponds to the average time needed for the IC to complete the determination of the target voltage $V_T$. The controller 25 comprises for example a counter to count a number of clock pulses to determine if the tracking time period $T_T$ has lapsed.

In embodiments where the IC for energy harvesting is operating as a slave IC, the controller 25 is configured to switch from the normal operation state to the power point tracking state when the trigger signal $EN_{VC}$ switches from the second reference value to the first reference value. In other words, as the trigger signal $EN_{VC}$ is based on at least one input signal $S_{IN}$ for enabling the voltage converter, the slave IC only switches to the power point tracking state when triggered by an external signal from an additional IC for energy harvesting, i.e. from a master IC.

In slave IC embodiments, the controller 25 generates the status signal $PPT_{stat}$ by setting a status value to a first PPT value when the trigger signal $EN_{VC}$ switches from the second reference value to the first reference value and by setting the status value to a second PPT value after a tracking time period $T_T$ has lapsed. The controller 25 of the slave IC can for example also use a counter to count a number of clock pulses to determine if the tracking time period $T_T$ has lapsed.

If an IC for energy harvesting according to the invention, either a master or a slave IC, has completed its power point tracking, the controller 25 will disable the power point tracker but not necessarily immediately enable the voltage converter in order to switch to the normal operating state. The voltage converter will only be enabled when the trigger signal $EN_{VC}$ received from the interface circuit 16 has changed from the first reference value to the second reference value. Hence, until the trigger signal $EN_{VC}$ has changed to the second reference value, the IC can stay in an idle state wherein both the voltage converter and the power point tracker are disabled.

According to a further embodiment of the invention, a power management system 100 for energy harvesting is provided.

As discussed above, the interface circuit 16 is configured for both receiving the input signal $S_{IN}$ for enabling the voltage converter and for outputting the output signal $S_{OUT}$. By outputting the output signal $S_{OUT}$ comprising information indicating when the power point tracker 30 is enabled or disabled, an external device such as a second IC for energy harvesting can receive this signal and use this signal to enable the operation in the normal operation mode only when the first IC has completed its power point tracking.

Hence, the interface circuit and controller 25 according to the invention allows for synchronizing multiple IC's for energy harvesting from a common energy harvester in such a way that each of the IC's will only start operating in the normal operating state when at least the other IC's have completed their proper power point tracking. In this way, the determination of the optimum voltage during the power point tracking is not disturbed by another IC that is in the normal operating state extracting power from the energy harvester.

Figure 4:
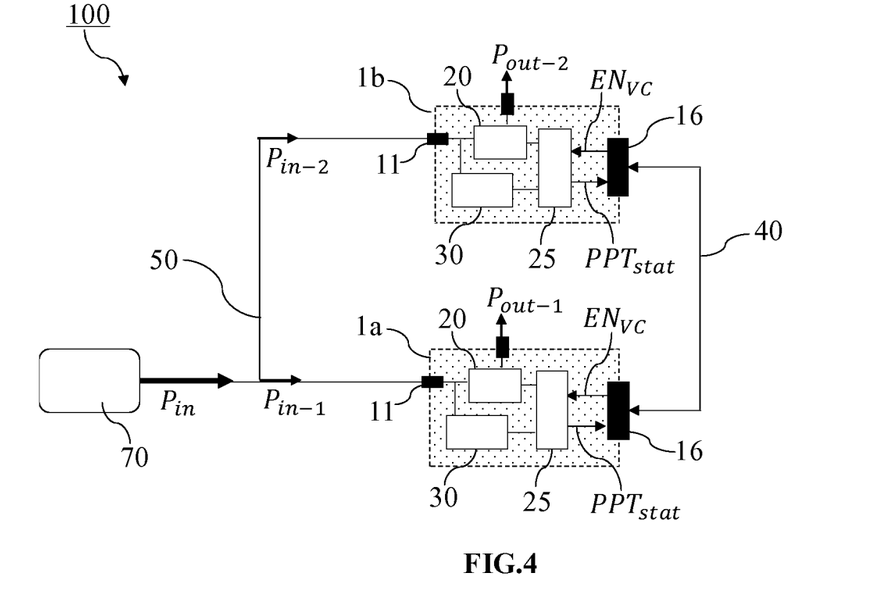
FIG. 4 shows a power management system according to the invention.

On FIG. 4, an example of a power management system 100 is shown comprising two IC's according to the invention. The power management system is not limited to the number of IC's that are coupled.

As illustrated on FIG. 4, the power management system 100 comprises an energy harvester 70, a first integrated circuit 1a operating as a master IC, at least a second integrated circuit 1b operating as a slave IC, a power distribution channel 50 coupling the energy harvester with the power input terminal 11 of the first and the second integrated circuit for supplying power from the energy harvester to both the first and second integrated circuit. In this example, as schematically illustrated on FIG. 4, the first IC for energy harvesting receives a power $P_{in-1}$ and the second IC for energy harvesting receives a power $P_{in-2}$. As schematically illustrated on FIG. 4, the first and second integrated circuit have an output terminal for supplying an output power $P_{out-1}$ and $P_{out-2}$, respectively.

The power management system 100 further comprises a connection means 40 for coupling the interface circuits 16 of the first and second integrated circuit. The interface circuits of the first and the second integrated circuit and the connection means 40 are configured such that the first integrated circuit 1a receives the at least one output signal $S_{OUT}$ from the second integrated circuit 1b as the at least one input signal for enabling the voltage converter $S_{IN}$ for the first integrated circuit. The second integrated circuit 1b receives the at least one output signal from the first integrated circuit 1a as the at least one input signal for enabling the voltage converter $S_{IN}$ for the second integrated circuit.

The power distribution channel 50 typically comprises one or more conducting paths for connecting the energy harvester with the power input of the integrated circuits.

Figure 6:
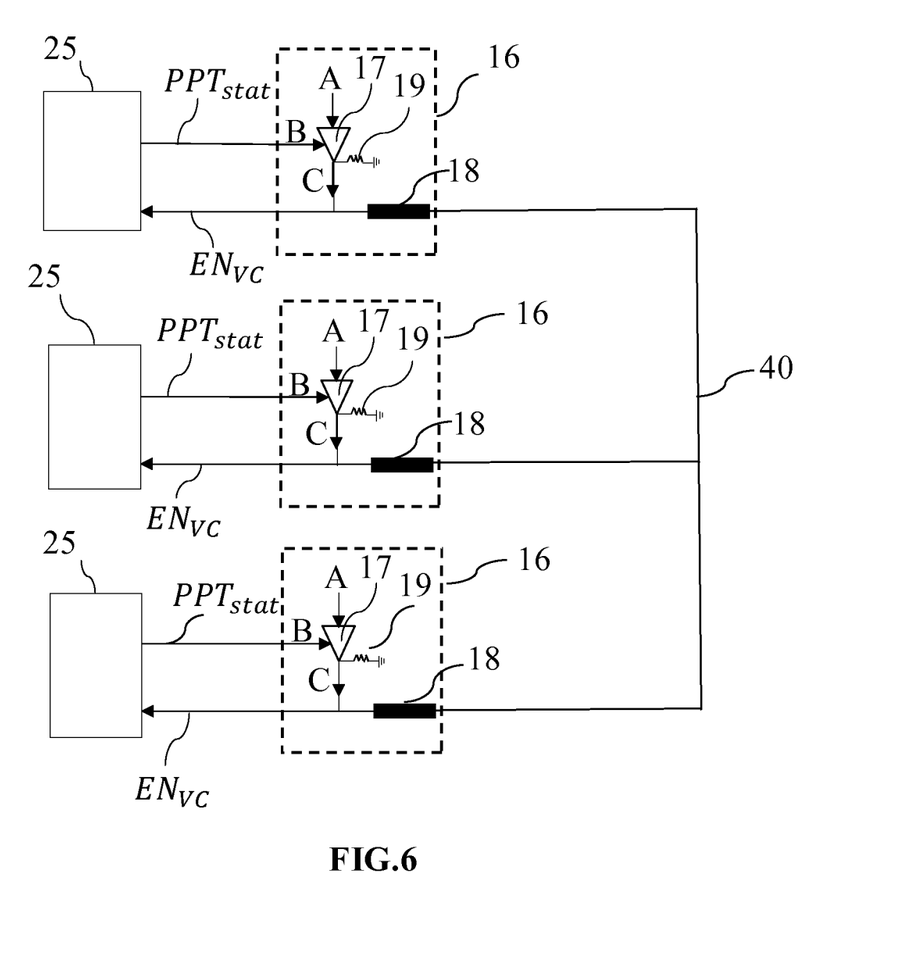

In FIG. 6, an example of coupling the interface circuit of three IC's for energy harvesting is schematically illustrated. In this example the interface circuit 16 of each of the IC's comprises a tri-state output device 17 as discussed above and a single wire 40 is connecting the communication terminals 18 of the IC's.

Figure 5:
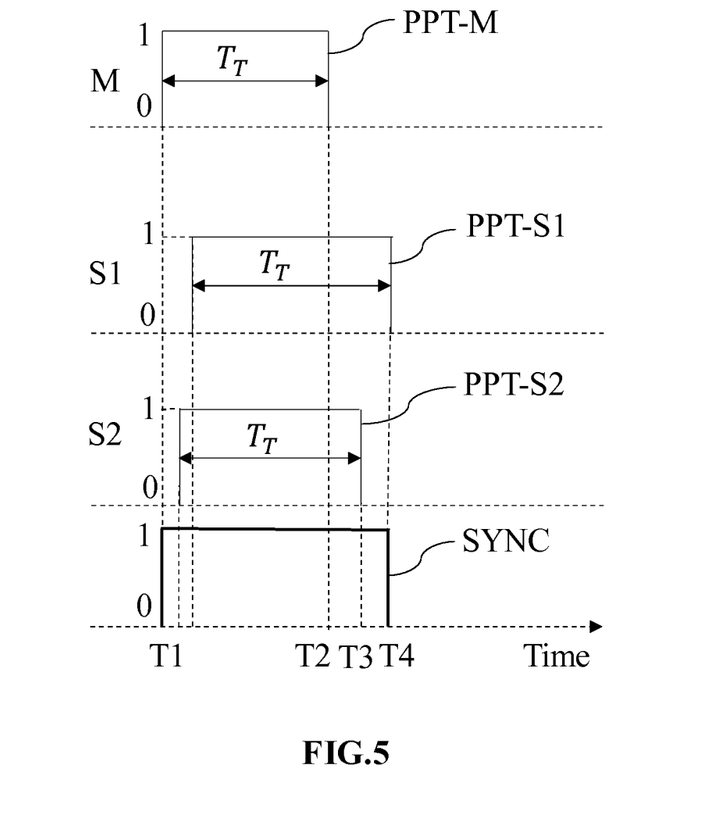
FIG. 5 illustrates a synchronisation of multiple IC's according to the invention, FIG. 6 schematically illustrates a coupling of multiple interface circuits.

The synchronisation of the IC's from a power management system 100 according to the invention is further illustrated on FIG. 5 with an example. On top of FIG. 5, an example of the status signal $PPT_{stat}$ of a master IC is shown, as indicated on the figure with reference PPT-M. This signal is high during the period the power point tracker is enabled. In this example, the master IC M starts a power point tracking at time T1 and ends it power point tracking by disabling its power point tracker, in this example at time T2. At the bottom of FIG. 5, the synchronisation signal SYNC is shown. This signal corresponds to the signal in the connection means 40 when a single bi-directional wire is used for coupling the interface circuits of the various IC's and wherein the interface circuits of each of the IC's of the power management system use a tri-state output device, as for example shown on FIG. 6. The SYNC signal will come high at the moment the master IC enables it power point tracker, i.e. at time T1. The slave S1 and the slave S2 that are monitoring the SYNC signal will also enable their power point tracker when detecting the variation of the SYNC signal from 0 to 1. As illustrated on FIG. 5 the slaves S1 and S2 might start enabling their power point tracking with a minor delay compared to the master M. The status signals of S1 and S2 are also shown on FIG. 5 and indicated with references PPT-S1 and PPT-S2. As the master and slave IC's perform their own power point tracking using their own internal clock signals, the duration $T_T$ to perform the power point tracking is not the same for all IC's. In this example, the master M finishes first at time T2, followed by the second slave S2 finishing at time T3 and the first slave S1 is finishing last at time T4. As shown on FIG. 5, the SYNC signal remains at 1 until the last IC has completed its power point tracking, in this example slave S2. When the last IC has finished the power point tracking, the SYNC signal switches from 1 to 0, what will trigger the switch for each of the IC's to the normal operating state and to start energy harvesting. In this way, the IC's, both master and slaves start energy harvesting at the same time, i.e. without any IC remaining in a power point tracking state.

Figure 7:
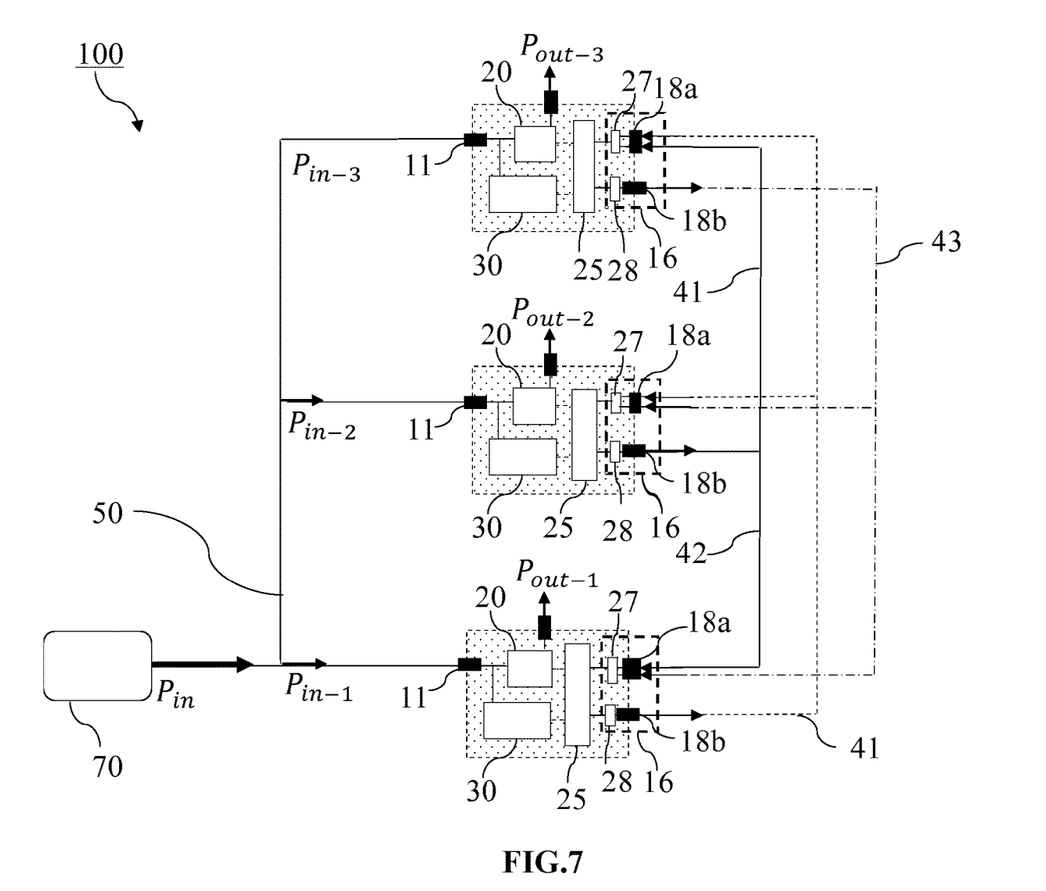
FIG. 7 shows a further example of a power management system according to the invention.

A further example of a power management system according to the invention is illustrated on FIG. 7 where a power distribution channel 50 is distributing power from a single energy harvester 70 to three IC's receiving a power $P_{in-1}$, $P_{in-2}$ and $P_{in-3}$, respectively. As schematically illustrated on FIG. 7, the three integrated circuit have an output terminal for supplying an output power $P_{out-1}$, $P_{out-2}$ and $P_{out-3}$ respectively. In this example, each interface circuit 16 of each IC comprises a first communication terminal 18a to receive multiple input signals for enabling the voltage converters and a communication terminal 18b to output the at least one output signal $S_{OUT}$. In this example, there are multiple wires 41,42,43 needed to connect the interface circuits as illustrated on FIG. 7. In this embodiment, the monitoring means 27 of each of the interface circuits comprises a combinatorial logic circuit receiving as input the multiple input signals from the interface circuits from the other IC's. The combinatorial logic circuit is configured to generate the trigger signal $EN_{VC}$ such that a high level 1 is outputted if at least one of the multiple input signals received has a high level 1 and a low level zero is outputted only if each of the input signals received has a low level zero.

As discussed above, voltage converters and power point trackers are known in the art and, as also known, a minimum operational voltage is needed to start up the controller and operate the voltage converter and power point tracker when the integrated circuit is for example used for the first time and no voltage is available that could be used as a start-up voltage. In embodiments known in the art, the start-up voltage is provided by a battery or in alternative embodiments, such as in the AEM10940 PMIC referenced above or as in the PMIC referenced in for example WO2016/073944A1, a dedicated start-up circuit is used that can acquire energy from the energy harvester at low input voltages to charge a capacitor until a minimum voltage is reached allowing to power-up the integrated circuit.

In WO2016/073944A1, for example, a dedicated charge pump and start-up capacitor is used to acquire a voltage that is sufficient to enable the activation of the controllers of the circuit and start using a DC-DC boost voltage converter and a power point tracker for efficient power extraction. In WO2016/073944A1, the powering-up of the circuit when the circuit is used for the first time is named start-up mode which is followed by what is named in this document a maximum power point tracking mode (MPPT mode). During the start-up mode no power point tracker is used as there is no sufficient voltage to activate the controls. The MPPT mode defined in WO2016/073944A1 is a mode wherein the voltage converter extracts energy from the energy harvesting and where at regular time intervals this energy harvesting is interrupted and a power point tracker is used to determine the target voltage $V_T$ for the regulating the input voltage of the voltage converter. Hence, these interruption periods correspond to what is named in the current patent application the power point tracking state wherein the voltage converter is disabled and the power point tracker is enabled for determining the target voltage $V_T$. In WO2016/073944A1, this interruption for the MPPT mode is, as mentioned above, managed by a clock generator providing start and stop inputs at a 600 microsecond period and at a 7/8 duty cycle. Hence, in contrast to the current invention, there is no disclosure in WO2016/073944A1 that in order to switch back to the normal operating state wherein the power point tracker is disabled and the voltage converter enabled, a condition is that a trigger signal is received from an interface circuit configured for exchanging signal information between the controller and one or more additional IC's for energy harvesting.

According to a further aspect of the invention, a method for managing energy from a single energy harvester is provided. The method comprises steps of
  providing a plurality of integrated circuits for energy harvesting, wherein each of the integrated circuits comprises a voltage converter (20) for converting an input power into an output power and a power point tracker (30) for determining a target voltage for regulating an input voltage of the voltage converter,
  coupling the single energy harvester (70) to said plurality of integrated circuits for energy harvesting so as to supply power from the single energy harvester to each of the integrated circuits,
and, the method comprising for each integrated circuit of the plurality of integrated circuits for energy harvesting further steps of
  communicating at least one output signal $S_{OUT}$ to each of the other integrated circuits for energy harvesting, wherein said at least one output signal $S_{OUT}$ comprises information indicating if the power point tracker is enabled or disabled,
  monitoring if the power point trackers of the other integrated circuits for energy harvesting are enabled or disabled,
  enabling the voltage converter for starting energy harvesting on condition that each of the power point trackers of the other integrated circuits for energy harvesting are disabled.

According to preferred embodiments for managing energy from a single energy harvester, one of the plurality of integrated circuits for energy harvesting is configured as a master IC. The controller 25 of the master IC comprises a power point triggering device to trigger the controller to disable the voltage converter 20 and to enable the power point tracker 30 to start determining the target voltage $V_T$. In this embodiment, each of the other integrated circuits for energy harvesting are configured as a slave IC wherein a controller 25 is configured to disable the voltage converter 20 and enable the power point tracker 30 to start determining the target voltage $V_T$ only when the master IC has enabled its power point tracker.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of the current disclosure.

The invention claimed is:

1. An integrated circuit (1) for energy harvesting comprising
  a power input terminal (11) for receiving an input power ($P_{in}$, $P_{in-1}$, $P_{in-2}$, $P_{in-3}$) from an energy harvester,
  a voltage converter (20) for converting said input power into an output power,
  a power output terminal (12) for supplying the output power ($P_{out}$, $P_{out-1}$, $P_{out-2}$, $P_{out-3}$) to an energy storage device or an application load,
  a power point tracker (30) for determining a target voltage $V_T$ for regulating an input voltage of the voltage converter,
  a controller (25) for controlling said voltage converter (20) and said power point tracker (30), and wherein said controller (25) is configured for switching the integrated circuit (1) to various operation states, and wherein said various operation states comprise at least
    a normal operation state wherein the power point tracker is disabled and wherein the voltage converter (20) is enabled for converting the input power into the output power, and
    a power point tracking state wherein the voltage converter (20) is disabled and wherein the power point tracker (30) is enabled for determining said target voltage $V_T$, characterized in that said integrated circuit for energy harvesting (1) comprises
  an interface circuit (16) for exchanging signal information between said controller (25) and one or more additional controllers of an additional one or more integrated circuits for energy harvesting, and
  wherein said controller (25) is coupled with said interface circuit (16) and configured for
  transmitting a status signal ($PPT_{stat}$) to said interface circuit (16), wherein a first PPT value and a second PPT value of said status signal ($PPT_{stat}$) indicate if said power point tracker (30) is respectively enabled or disabled, and
  receiving a trigger signal ($EN_{VC}$) from said interface circuit (16) and switching the integrated circuit (1) to the normal operating state on condition that said trigger signal ($EN_{VC}$) has changed from a first reference value to a second reference value.

2. The integrated circuit (1) according to claim 1 wherein said interface circuit (16) comprises
  a monitoring means (27) configured for
    monitoring at least one input signal ($S_{IN}$) from said one or more additional integrated circuits for energy harvesting, and for
    generating said trigger signal ($EN_{VC}$) based on said at least one input signal ($S_{IN}$), and
  an outputting means (28) for generating, based on said power point tracker status signal ($PPT_{stat}$), at least one output signal ($S_{OUT}$) for said one or more additional integrated circuits for energy harvesting, and wherein said at least one output signal ($S_{OUT}$) comprises information indicating if said power point tracker (30) is enabled or disabled.

3. The integrated circuit (1) according to claim 1 wherein said controller (25) is configured to disable said power point tracker (30) when said determining of the target voltage $V_T$ is completed.

4. The integrated circuit (1) according to claim 1, wherein said first PPT value and said second PPT value of said status signal (PPT$_{stat}$) correspond to a digital one value and a digital zero value, respectively, and wherein said first reference value and said second reference value of said trigger signal (EN$_{VC}$) corresponds to a digital one value and a digital zero value, respectively.

5. The integrated circuit (1) according to claim 2 wherein said outputting means (28) comprises a tri-state output device (17) comprising
a first input A operably set to a digital one value,
a second enabling input B linked with said controller (25) for receiving said status signal (PPT$_{stat}$), and
an output C for providing said at least one output signal (S$_{OUT}$), and wherein said output C is coupled to a ground level through a resistor (19).

6. The integrated circuit (1) according to claim 2 wherein said interface circuit (16) comprises at least one communication terminal (18, 18a, 18b) for receiving said at least one input signal (S$_{IN}$) and for outputting said at least one output signal (S$_{OUT}$).

7. The integrated circuit (1) according to claim 2 wherein said interface circuit (16) comprises
a first communication terminal (18a) for receiving said at least one input signal (S$_{IN}$), and
a second communication terminal (18b) for outputting said at least one output signal (S$_{OUT}$).

8. The integrated circuit (1) according to claim 1 wherein said controller (25) comprises a power point triggering device for triggering a switching from said normal operation state to said power point tracking state.

9. The integrated circuit (1) according to claim 8 wherein said power point triggering device comprises a timer and wherein the power point triggering device is configured to switch from said normal operation state to said power point tracking state when a harvesting time period T$_H$ measured with said timer has lapsed while being in said normal operation state.

10. An integrated circuit (1) according to claim 1 wherein said controller (25) is configured to switch from said normal operation state to said power point tracking state when said trigger signal (EN$_{VC}$) switches from said second reference value to said first reference value.

11. A method for managing energy from a single energy harvester (70) comprising
providing a plurality of integrated circuits for energy harvesting, wherein each of the integrated circuits comprises a voltage converter (20) for converting an input power into an output power and a power point tracker (30) for determining a target voltage V$_T$ for regulating an input voltage of the voltage converter,
coupling the single energy harvester (70) to said plurality of integrated circuits for energy harvesting so as to supply power from the single energy harvester to each of the integrated circuits, and, the method comprising for each integrated circuit of the plurality of integrated circuits for energy harvesting
communicating at least one output signal (S$_{OUT}$) to each of the other integrated circuits for energy harvesting, wherein said at least one output signal (S$_{OUT}$) comprises information indicating if the power point tracker (30) is enabled or disabled,
monitoring if the power point trackers of the other integrated circuits for energy harvesting are enabled or disabled,
enabling the voltage converter (20) for starting energy harvesting on condition that each of the power point trackers of the other integrated circuits for energy harvesting are disabled.

12. The method for managing energy from a single energy harvester according to claim 11 wherein
one of said plurality of integrated circuits for energy harvesting is configured as a master IC wherein a controller (25) comprises a power point triggering device to trigger the controller to disable the voltage converter (20) and to enable the power point tracker (30) to start determining the target voltage V$_T$, and
wherein each of the other integrated circuits for energy harvesting are configured as a slave IC wherein a controller (25) is configured to disable the voltage converter (20) and enable the power point tracker (30) to start determining the target voltage V$_T$ only when said master IC has enabled its power point tracker.

13. An integrated circuit (1) for energy harvesting comprising
a power input terminal (11) for receiving an input power (P$_{in}$, P$_{in-1}$, P$_{in-2}$, P$_{in-3}$) from an energy harvester;
a voltage converter (20) for converting said input power into an output power;
a power output terminal (12) for supplying the output power (P$_{out}$, P$_{out-1}$, P$_{out-2}$, P$_{out-3}$) to an energy storage device or an application load;
a power point tracker (30) for determining a target voltage V$_T$ for regulating an input voltage of the voltage converter;
a controller (25) for controlling said voltage converter (20) and said power point tracker (30), and wherein said controller (25) is configured for switching the integrated circuit (1) to various operation states, and wherein said various operation states comprise at least:
a normal operation state wherein the power point tracker is disabled and wherein the voltage converter (20) is enabled for converting the input power into the output power, and
a power point tracking state wherein the voltage converter (20) is disabled and wherein the power point tracker (30) is enabled for determining said target voltage V$_T$;
wherein said integrated circuit for energy harvesting (1) comprises:
an interface circuit (16) for exchanging signal information between said controller (25) and one or more additional controllers of an additional one or more integrated circuits for energy harvesting,
wherein said controller (25) is coupled with said interface circuit (16) and is configured for:
transmitting a status signal (PPT$_{stat}$) to said interface circuit (16), wherein a first PPT value and a second PPT value of said status signal (PPT$_{stat}$) indicate if said power point tracker (30) is respectively enabled or disabled, and
receiving a trigger signal (EN$_{VC}$) from said interface circuit (16) and switching the integrated circuit (1) to the normal operating state on condition that said trigger signal (EN$_{VC}$) has changed from a first reference value to a second reference value; and
wherein said interface circuit (16) comprises:
a monitoring means (27) configured for:
monitoring at least one input signal (S$_{IN}$) from said one or more additional integrated circuits for energy harvesting, and for generating said trigger signal ($EN_{VC}$) based on said at least one input signal ($S_{IN}$), and an outputting means (28) for generating, based on said power point tracker status signal ($PPT_{stat}$), at least one output signal ($S_{OUT}$) for said one or more additional integrated circuits for energy harvesting, and wherein said at least one output signal ($S_{OUT}$) comprises information indicating if said power point tracker (30) is enabled or disabled.

\* \* \* \* \*